United States Patent
Edpalm et al.

(10) Patent No.: US 10,523,940 B2
(45) Date of Patent: Dec. 31, 2019

(54) METHOD AND ENCODER SYSTEM FOR DETERMINING GOP LENGTH FOR ENCODING VIDEO

(71) Applicant: Axis AB, Lund (SE)

(72) Inventors: Viktor Edpalm, Lund (SE); Xing Danielsson Fan, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/921,302

(22) Filed: Mar. 14, 2018

(65) Prior Publication Data

US 2018/0270482 A1 Sep. 20, 2018

(30) Foreign Application Priority Data

Mar. 14, 2017 (EP) .................................. 17160703

(51) Int. Cl.
*H04N 19/124* (2014.01)
*H04N 19/177* (2014.01)
(Continued)

(52) U.S. Cl.
CPC ......... *H04N 19/124* (2014.11); *H04N 19/114* (2014.11); *H04N 19/137* (2014.11);
(Continued)

(58) Field of Classification Search
CPC .. H04N 19/114; H04N 19/124; H04N 19/137; H04N 19/146; H04N 19/147;
(Continued)

(56) References Cited

U.S. PATENT DOCUMENTS 5,506,686 A * 4/1996 Auyeung ............. H04N 19/159
358/426.03
5,592,225 A * 1/1997 Kurobe ............... H04N 19/172
375/240.03
(Continued)

FOREIGN PATENT DOCUMENTS

EP 3 021 579 A1 5/2016

OTHER PUBLICATIONS acti.com; Reduce Bandwith Consumption by GOP Settings; Nov. 20, 2009; acti; pp. 1-5.*
(Continued)

*Primary Examiner* — Peter D Le
(74) *Attorney, Agent, or Firm* — Volpe and Koenig, P.C.

(57) ABSTRACT

A method of determining a maximum permissible key frame distance for use in encoding image frames in a video sequence comprising encoding a plurality of video test sequences, each video test sequence having a respective noise level, where each video test sequence is encoded using a respective quantization parameter and a plurality of key frame distances is disclosed. For each video test sequence, an output bitrate is determined for each key frame distance. For each combination of noise level, quantization parameter, and key frame distance, the determined output bitrate is stored and a maximum key frame distance at which output bitrate decreases in response to an increase in key frame distance is identified as maximum permissible key frame distance. A method of encoding image frames in a video sequence is also disclosed, as well as a system, a camera and a computer program product for performing the methods.

9 Claims, 6 Drawing Sheets

(51) Int. Cl.
*H04N 19/114* (2014.01)
*H04N 19/146* (2014.01)
*H04N 19/137* (2014.01)
*H04N 19/147* (2014.01)
*H04N 19/159* (2014.01)
*H04N 19/196* (2014.01)
*H04N 19/573* (2014.01)

(52) U.S. Cl.
CPC ......... *H04N 19/146* (2014.11); *H04N 19/147* (2014.11); *H04N 19/159* (2014.11); *H04N 19/177* (2014.11); *H04N 19/196* (2014.11); *H04N 19/573* (2014.11)

(58) Field of Classification Search
CPC .. H04N 19/159; H04N 19/177; H04N 19/196; H04N 19/573
See application file for complete search history.

(56) References Cited

U.S. PATENT DOCUMENTS

| | | | | |
|---|---|---|---|---|
| 5,617,145 A * | 4/1997 | Huang | ............... | H04N 21/2368 348/423.1 |
| 6,023,296 A * | 2/2000 | Lee | ............... | H04N 19/172 375/240.05 |
| 6,125,147 A * | 9/2000 | Florencio | ............... | G06T 3/4084 375/240.26 |
| 6,278,735 B1 * | 8/2001 | Mohsenian | ............... | H04N 19/176 375/240 |
| 6,654,417 B1 * | 11/2003 | Hui | ............... | H04N 19/105 375/240.02 |
| 6,956,898 B1 * | 10/2005 | Podilchuk | ............... | H04N 19/61 375/240 |
| 7,020,198 B2 * | 3/2006 | Wang | ............... | H04N 21/23655 375/240.12 |
| 8,401,076 B2 * | 3/2013 | Coulombe | ............... | H04N 19/159 375/240.12 |
| 2003/0202580 A1 * | 10/2003 | Noh | ............... | H04N 9/8042 375/240.03 |
| 2003/0202706 A1 * | 10/2003 | Uchibayashi | ............... | G06T 9/00 382/236 |
| 2005/0031034 A1 * | 2/2005 | Kamaci | ............... | H04N 19/176 375/240.03 |
| 2005/0047509 A1 * | 3/2005 | Lee | ............... | H04N 19/63 375/240.19 |
| 2006/0293902 A1 * | 12/2006 | Kim | ............... | G10L 19/167 704/500 |
| 2007/0019724 A1 * | 1/2007 | Tourapis | ............... | H04N 19/105 375/240.12 |
| 2007/0030894 A1 * | 2/2007 | Tian | ............... | H04N 19/176 375/240.02 |
| 2008/0232468 A1 * | 9/2008 | Kwon | ............... | H04N 19/147 375/240.12 |
| 2012/0195388 A1 * | 8/2012 | Oike | ............... | H04N 21/2402 375/259 |
| 2013/0286868 A1 * | 10/2013 | Oyman | ............... | H04W 24/06 370/252 |
| 2014/0119434 A1 * | 5/2014 | Zhang | ............... | H04N 19/176 375/240.03 |
| 2014/0254660 A1 * | 9/2014 | La | ............... | H04N 19/176 375/240.02 |
| 2015/0296188 A1 * | 10/2015 | Meganathan | ............... | H04N 7/181 348/143 |
| 2016/0142705 A1 * | 5/2016 | Fan | ............... | H04N 19/503 375/240.13 |
| 2016/0337647 A1 | 11/2016 | Cheok et al. | | |

OTHER PUBLICATIONS

"Efficient Real-Time Distributed Video Coding by Parallel Progressive Side Information Regeneration", Shen Yun-Chung et al.; IEEE Sensors Journal, IEEE Service Center, New York, NY, US, vol. 17. No. 6, (Jan. 16, 2017), pp. 1872-1883, XP011641630, ISSN: 1530-437X, DOI: 10.1109/JSEN.2017.2653100 [retrieved on Feb. 17, 2017].
EP 17160703.9 European Search Report (dated May 18, 2017).

* cited by examiner

METHOD AND ENCODER SYSTEM FOR DETERMINING GOP LENGTH FOR ENCODING VIDEO

FIELD OF INVENTION

The present teachings relate to the field of video encoding, and more specifically to determining suitable parameters for encoding.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode. In the intra mode, the luminance and chrominance channels (or in some cases RGB or Bayer data) are encoded by exploiting the spatial redundancy of the pixels in a given channel of a single frame via prediction, transform, and entropy coding. The encoded frames are called intra-frames, and may also be referred to as I-frames. Within an intra-frame, blocks of pixels, also referred to as macroblocks, coding units or coding tree units, are encoded in intra-mode, meaning that they are encoded with reference to a similar block within the same image frame, or raw coded with no reference at all. The inter mode instead exploits the temporal redundancy between separate frames, and relies on a motion-compensation prediction technique that predicts parts of a frame from one or more previous frames by encoding the motion in pixels from one frame to another for selected blocks of pixels. The encoded frames are called inter-frames, and may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction. Within an inter-frame, blocks of pixels may be encoded either in inter-mode, meaning that they are encoded with reference to a similar block in a previously decoded image, or in intra-mode, meaning that they are encoded with reference to a similar block within the same image frame, or raw-coded with no reference at all.

The encoded image frames are arranged in groups of pictures, or GOPs for short. Each group of pictures is started by an intra-frame, which does not refer to any other frame. The intra-frame is followed by a number of inter-frames, which do refer to other frames. As mentioned above, there are different kinds of inter-frames. For a P-frame, the reference frame is one or more previously encoded and decoded image frames, appearing before the P-frame in display order. For B-frames, two or more reference frames are used, and one of the reference frames may for instance be displayed before the B-frame, whereas the other reference frame is displayed after the B-frame. Image frames do not necessarily have to be encoded and decoded in the same order as they are captured or displayed. The only inherent limitation is that for a frame to serve as reference frame, it has to be decoded before the frame that is to use it as reference can be encoded. In surveillance or monitoring applications, encoding is generally done in real time, meaning that the most practical approach is to encode and decode the image frames in the same order as they are captured and displayed, as there will otherwise be undesired latency.

Some codecs also use another kind of inter-frame, which is sometimes referred to as a refresh-frame or an R-frame. In the same way as other inter-frames, a refresh-frame generally uses intra mode encoding for moving parts of the image, whereas static parts or background parts are encoded using inter mode encoding. Different from a P-frame, an R-frame does not use the nearest preceding decoded P-frame as reference frame, but refers back to the I-frame at the start of the GOP. In this manner, errors or artefacts that propagate as the distance from the I-frame increases are reset. Hereby, the next P-frame in the GOP may get a better starting point, leading to a lower number of bits for representing the P-frame. Another advantage of using R-frames is that it gives more flexibility in playback of the encoded and decoded video sequence. If a user wants to play back an encoded video sequence, the video sequence has to be decoded. In order to be able to decode a particular frame, its reference frame has to be decoded first. In a video sequence with a GOP structure using only I-frames and P-frames (and possibly B-frames), the I-frame at the start of the GOP has to be decoded before any of the subsequent image frames in the GOP can be decoded. If long GOP lengths are used, the time it takes to decode all preceding image frames in the GOP may be considerable when the user wishes to start playback at a point in time in the video sequence that happens to be close to the end of a GOP. If R-frames are encoded at regular or irregular intervals along the GOP, less frames have to be decoded before playback can start, as only the R-frame that is closest before the chosen playback start and the I-frame starting the GOP have to be decoded, and not the frames between the I-frame and that R-frame. A possible disadvantage of using R-frames is that a decoded version of the I-frame at the start of the GOP has to be retained as reference frame for all R-frames in the GOP, whereas if only P-frames are used, only the decoded version of the previous frame has to be retained and can be continuously replaced as image frames are encoded. Thus, the use of R-frames requires retaining two possible reference frames, and if only P-frames are used, only one reference frame has to be retained.

Encoding is often controlled by a rate controller, which may employ a constant bitrate (CBR), a maximum bitrate (MBR), or a variable bitrate (VBR). CBR means that the encoder will strive to always output the same bitrate, regardless of what happens in the captured scene. If bandwidth is limited, this may lead to low quality images when there is a motion in the scene, but high quality images when the image is static. In a surveillance or monitoring situation, this is generally not useful, as a scene with motion is normally of more interest than a static scene. With MBR, the bitrate is allowed to vary, as long as it does not exceed the bitrate limit set. The problems related to this approach are similar to the ones associated with CBR. If the MBR limit is set too low, images of a scene with motion may be of low quality. However, if the limit is set higher, in order to accommodate the motion, the output bitrate may be unnecessarily high when encoding images of a static scene. VBR may also be referred to as constant quality bitrate, meaning that the quality of the encoded images should be kept constant, but the output bitrate is allowed to vary depending on what is happening in the scene. This approach may lead to high output bitrate when there is motion in the scene. This is particularly problematic if bandwidth is limited, such as when transmitting encoded images over a mobile network. Similarly, it is problematic if storage is limited, such as when storing images on board the camera, e.g., on an SD card. High output bitrates may also be problematic in large systems of cameras if several cameras transmit images of scenes with motion simultaneously.

Regardless of the bitrate control scheme used by the rate controller, one of the parameters that the encoder can adjust in order to comply with the bitrate set by the rate controller is the GOP length. In some applications, the GOP length is set manually, by user input. In others, it is determined dynamically, e.g., based on image analysis. A longer GOP length generally gives a lower output bitrate, since inter-frames generally require fewer bits for representation than intra-frames. However, the inventors of the present disclosure have discovered that this is not always true. In some instances, increasing the GOP length may in fact not give rise to the desired bitrate reduction. The output bitrate may be decreased, but not as much as would have been expected based on the size of the GOP length increase. This is detrimental in that bandwidth requirement may become unnecessarily high, while at the same time image quality is low. Hence, there is a need for an improved encoding method.

SUMMARY

In view of the above, it is an object of the disclosure to provide a method of determining how long key frame distances or GOP lengths should be for enabling efficient bit usage.

Another object is to provide a method of encoding image frames in a video sequence, which makes it possible to limit output bitrate.

A further object is to provide an arrangement that makes it possible to determine a maximum permissible key frame distance for use in encoding image frames in a video sequence, such that bits may be used efficiently.

It is also an object to provide an encoder and a camera that can encode image frames efficiently.

Another object is to provide a computer program product that enables determination of suitable GOP lengths and key frame distances, and that enables efficient encoding of image frames in a video sequence.

According to a first aspect, these and other objects are achieved, in full or at least in part, by a method of determining a maximum permissible key frame distance for use in encoding image frames in a video sequence, the method comprising: encoding a plurality of video test sequences, each video test sequence having a respective noise level, wherein each video test sequence is encoded using a respective quantization parameter and using a plurality of key frame distances, for each video test sequence determining an output bitrate for each key frame distance, storing, for each combination of noise level, quantization parameter, and key frame distance, the determined output bitrate, for each such combination of noise level and quantization parameter, identifying as maximum permissible key frame distance a maximum key frame distance at which output bitrate decreases in response to an increase in key frame distance. With such a method, it is possible to study the behavior of an encoder and to determine how much it makes sense to increase GOP lengths or key frame distances in order to save on bitrate. It should be noted that the video test sequences preferably capture a static scene, as otherwise varying scene motion may make it difficult to deduce how noise impacts the maximum permissible key frame distance.

For each combination of noise level and quantization parameter the maximum permissible key frame distance may be stored in a look-up table. This is a practical way of providing the maximum permissible key frame distances for later use.

The method may further comprise generating the video test sequences by adding different amounts of noise to an original video test sequence. In this manner, the effect of noise on maximum permissible GOP length or key frame distance may be seen clearly.

According to a second aspect, these and other objects are achieved, in full or at least in part, by a method of encoding image frames in a video sequence. The image frames are encoded into a sequence of output image frames arranged in groups of pictures, each group of pictures comprising an intra-frame and one or more subsequent inter-frames, each group of pictures in said sequence of output image frames having a key frame distance defined by a number of frames separating the intra-frame and a subsequent inter-frame directly referencing the intra-frame. The method comprises: determining a noise level of at least one image frame in said video sequence, determining a representative quantization parameter with which said image frames are to be encoded, based on the determined noise level and the determined quantization parameter, selecting a maximum permissible key frame distance determined in accordance with the method according to the first aspect, and encoding the image frames in the video sequence using the determined quantization parameter and using a key frame distance which is less than or equal to the maximum permissible key frame distance. This method makes it possible to encode image frames in a video sequence efficiently, such that bitrate may be reduced.

The key frame distance with which the image frames are encoded may be determined dynamically. A dynamic determination of GOP length or key frame distance, as opposed to a fixed setting may enable a more efficient use of bits while delivering good quality images of interesting events in the captured scene.

The key frame distance may be determined based on motion in at least one image frame in the video sequence.

The key frame distance may be a GOP length defined by the number of image frames in a group of pictures each group of pictures comprising an intra-frame and one or more subsequent inter-frames.

According to a variant of the method, the GOP length with which the image frames are encoded is determined by calculating a group value for each group of neighboring pixels of a current image frame based on information representative of the pixels in the current image frame, accumulating group values of corresponding groups of neighboring pixels in a first sequence of image frames comprising the current image frame and a first number of preceding image frames to form a first accumulation of accumulated group values, accumulating group values of corresponding groups of neighboring pixels in a second sequence of image frames comprising the current image frame and a second number of preceding image frames to form a second accumulation of accumulated group values, wherein the second sequence of image frames includes image frames captured over a longer period of time than the image frames of the first sequence, comparing accumulated group values of said first accumulation with accumulated group values of corresponding groups of neighboring pixels of said second accumulation, calculating a global change value based on the comparison of the first and second accumulations of group values, and determining the GOP length based on the global change value. This approach makes it possible to adapt the GOP length, such that more bits and better image quality may be achieved when there is motion in the monitored scene, and such that bits may be saved when there is little or no motion in the scene.

In a variant of the method, the image frames are encoded using a key frame distance which is less than or equal to the smaller of the maximum permissible key frame distance and a system maximum key frame distance, said system maximum key frame distance being determined based on at least one of a system buffer size and a system playback time limit. Hereby, the key frame distance may be wisely selected, such that bitrate may be limited and unnecessary quality decrease may be avoided.

According to a third aspect, these and other objects are achieved, in full or at least in part, by a maximum key frame distance selection arrangement for determining a maximum permissible key frame distance for use in encoding image frames in a video sequence, said arrangement comprising: a test video sequence evaluation module arranged to encode a plurality of video test sequences, each video test sequence having a respective noise level, wherein each video test sequence is encoded using a respective quantization parameter and using a plurality of key frame distance, and for each video test sequence determine an output bitrate for each key frame distance, a memory module arranged to store, for each combination of noise level, quantization parameter, and key frame distance, the determined output bitrate, and a selection module arranged to, for each such combination of noise level and quantization parameter, identify as maximum permissible key frame distance a maximum key frame distance at which output bitrate decreases in response to an increase in key frame distance. Such an arrangement makes it possible to avoid using long key frame distances or GOP lengths that do not give a desired bitrate reduction and that unnecessarily lower image quality.

According to a fourth aspect, these and other objects are achieved, in full or at least in part, by an encoder system for encoding image frames in a video sequence, said system comprising: an encoder module arranged to process input image frames into intra-frames or inter-frames arranged in groups of pictures, each group of pictures comprising an intra-frame and one or more subsequent inter-frames, a quantization parameter determination module arranged to determine a representative quantization parameter with which said image frames are to be encoded, a noise determination module arranged to determine a noise level of at least one input image frame in said video sequence, a key frame distance determination module arranged to, based on the determined noise level and the determined quantization parameter, select a maximum permissible key frame distance determined in accordance with the method according to the first aspect, or using the maximum key frame distance selection arrangement according to the third aspect, and to determine a key frame distance with which the image frames are to be encoded, said key frame distance being less than or equal to the maximum permissible key frame distance. Such an encoder system enables bitrate efficient encoding of image frames in a video sequence.

According to a fifth aspect, these and other objects are achieved, in full or at least in part, by a camera comprising an encoder system according to the fourth aspect.

According to a sixth aspect, these and other objects are achieved, in full or at least in part, by a computer program product comprising a computer-readable storage medium with instructions adapted to carry out the method according to the first or second aspect when executed by a processor.

As used herein, the term "key frame distance" means the number of frames in a sequence of frames from an intra-frame to the next frame in the sequence that has the decoded intra-frame as reference frame, and not the encoded and decoded preceding frame. In other words, the key frame distance is the longest sequence, measured in number of frames, from an intra-frame starting a GOP to the next frame that resets referencing back to the intra-frame.

The term "GOP length" means the number of image frames in a group of pictures. As discussed in the background section, when encoding image frames in a video sequence, the encoded image frames are arranged in groups of pictures, each group of pictures comprising an intra-frame and zero or more subsequent inter-frames. Thus, for example, a GOP length of 1 means that each GOP is made up of just an intra-frame, whereas a GOP length of 50 means that each GOP is made up of one intra-frame and 49 subsequent inter-frames. It may be noted that in the context of the present teachings, GOP lengths of 1 are not of interest, as will be discussed in further detail later on. GOP length is a special case of key frame distance. The GOP length may be seen as the key frame distance in a sequence of image frames where all inter-frames refer back to a previously encoded and decoded inter-frame (except the first inter-frame in the GOP, which by necessity refers back to the decoded intra-frame starting the GOP), and where no inter-frames down the line of the GOP refer directly back to the intra-frame starting the GOP. In other words, the GOP length is the distance, measured in number of frames, between one intra-frame starting one GOP and the next intra-frame starting the next GOP.

A further scope of applicability of the present teachings will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

Figure 1:
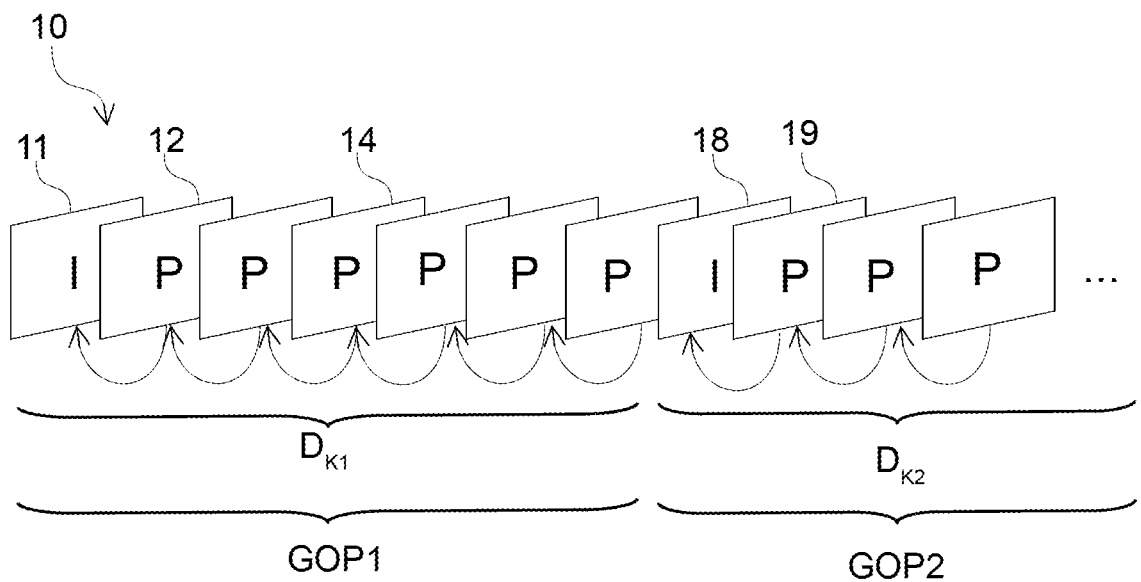
FIG. 1 is an illustration of a video sequence of encoded image frames arranged in groups of pictures.

In FIG. 1, a first video sequence 10 of encoded image frames is schematically shown. The video sequence 10 is encoded with a GOP structure employing only I-frames and P-frames. Each GOP is started by an I-frame, which is followed by a number of P-frames. As already discussed above, the number of frames in the GOP is also referred to as the GOP length. Thus, in the example shown in FIG. 1, the GOP length used is seven, as there are one I-frame and six P-frames in GOP1. It should be noted that this is a simplified example, in order not to clutter the drawing, and that the GOP length used when encoding video sequences for monitoring or surveillance is usually longer. In many cases a GOP length leading to one I-frame per second is quite commonly used. This means that with a frame rate of, e.g., 30 fps, a GOP length of 30 is often used.

GOP lengths as short as one may be used when encoding image frames in a video sequence. A GOP length of one means that each GOP is made up of just an intra-frame, with no inter-frames. It should be understood that the problems that the present teachings are intended to solve arise only with GOP lengths longer than one, as otherwise there are no inter-frames in which errors may propagate. Thus, in the context of the present teachings, only GOP structures with an intra-frame and one or more subsequent inter-frames are of interest, i.e. with GOP lengths of two or more.

In FIG. 1, the arrow from the first P-frame 12 in GOP1 to the I-frame 11 at the start of GOP1 indicates that the first P-frame 12 uses a decoded version of the I-frame 11 as reference. Similarly, the arrow from the second P-frame 13 in GOP1 to the first P-frame 12 indicates that the second P-frame 13 uses a decoded version of the first P-frame 12 as reference. In the GOP structure shown in FIG. 1, each frame in GOP1 simply uses a decoded version of the preceding frame as reference.

Figure 2:
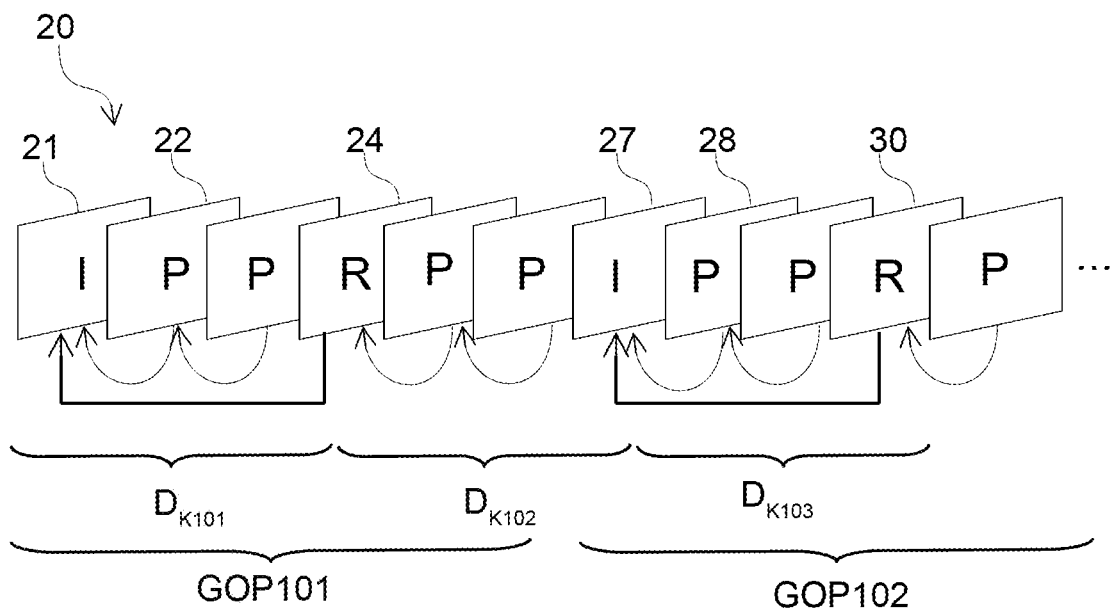
FIG. 2 is an illustration similar to FIG. 1, illustrating a video sequence in which refresh-frames are also encoded.

In FIG. 2, a second video sequence 20 is illustrated in which refresh-frames or R-frames are used in addition to the I-frames and P-frames. Here, as in the first video sequence 1, GOP101 is started by an I-frame 21, which is followed by five inter-frames, giving a GOP length of six. The first inter-frame after the I-frame 21 is a P-frame 22, in the same way as in the video sequence shown in FIG. 1. This P-frame 22 uses a decoded version of the I-frame 21 as reference, as indicated by the arrow from the first P-frame 22 to the I-frame 21. Similarly, the next frame, the second P-frame 23 uses a decoded version of the first P-frame 22 as reference. The frame after that is however not a P-frame, but an R-frame 24. As explained above in the background section, R-frames are essentially P-frames, but do not use a decoded version of the preceding P-frame as reference, but instead refer back to the I-frame at the start of the GOP. Thus, the first R-frame 24 uses the I-frame 21 starting the GOP101 as reference frame, as indicated by an arrow from the R-frame 24 to the I-frame 21.

In this simplified example, only a very short GOP length is used, for the sake of clarity of the drawings. However, in reality, considerably longer GOP lengths will be used. In most, if not all, encoding schemes, a quantization is performed, meaning that pixel values (often after transformation from the spatial domain to the frequency domain) are mapped to a finite number of quantization steps. This quantization leads to loss of information, which cannot be retrieved in dequantization when decoding the encoded image frames. For each P-frame (or B-frame) in a GOP, there is a risk of losing information, and the longer the GOP is, the more information may be lost. By employing a few R-frames along the GOP, the reference chain is restarted, in that the R-frame uses the initial I-frame of the GOP as reference frame. Hereby, better video quality may be obtained with the same GOP length. Correspondingly, it is possible to maintain the same video quality with a longer GOP length if R-frames are used.

In FIG. 2, the distance, in number of frames, from the I-frame starting GOP101 to the first R-frame 24 is marked with $D_{K101}$. This distance is called a key frame distance. Similarly, the distance from the first R-frame 24 to the second I-frame 27 starting the second GOP102 is a second key frame distance marked by $D_{K102}$.

Returning to FIG. 1, it should be noted that the GOP lengths shown there, GOP1 and GOP2 may also be referred to as key frame distances. However, in the first video sequence 10, there is just one chain of references in each GOP, since there are no R-frames. Thus, the key frame distance of the first GOP started by the first I-frame 11 is equal to GOP1, and the key frame distance of the second GOP started by the second I-frame 18 is equal to GOP2. In order to illustrate this, the first GOP is also marked as a first key frame distance $D_{K1}$ and the second GOP is marked as a second key frame distance $D_{K2}$.

Although it is generally expected that the bitrate should decrease with longer GOP lengths, the inventors of the present disclosure have discovered that the relationship between GOP length and bitrate is not quite straightforward. They have realized that as a GOP grows longer, there is a tendency that P-frames start to increase in size. This is due to propagation of errors. As each inter-frame is a sort of approximation, based on the previous frame, the following frame will in turn be an approximation of an approximation. Each inter mode encoded block of pixels in an inter-frame is encoded with a reference to a sufficiently similar block in the reference frame, along with a motion vector and a residual, describing how the current block differs from the reference block. This may after a number of inter-frames lead to quite large residuals, requiring many bits for encoding. As the residuals grow, it will at some point be inefficient to code the block as an inter-block, and instead it is encoded as an intra-block, with reference to another block in the same frame, or raw coded without reference to any other block. If many I-blocks are encoded in an inter-frame, this will generally require more bits than an inter-frame with fewer I-blocks.

This disclosure is based on the idea of studying the behavior of the size of inter-frames as the GOP length used for encoding is increased. The inventors have realized that a "sweet spot" may be found beyond which it does not make sense to increase GOP length in an effort to reduce output bitrate. It should be noted that there is not one unique maximum GOP length that will fit all encoders and all video sequences. Instead, a number of video test sequences, with a number of different noise levels are encoded with a number of different quantization parameters and using a number of different GOP lengths. For each combination of noise level, quantization parameter, and GOP length, the output bitrate is determined. By doing this for a number of combinations, it may be determined at which GOP length output bitrate stops decreasing with increasing GOP length. This principle will now be described in further detail with reference to FIGS. 3 and 4, which show an example of how the teachings of the disclosure may be carried out.

For determining a maximum permissible GOP length to use when encoding video sequences in an encoder, a number of video sequences are tested. For each such test, a video test sequence is provided (step S1). The video test sequence has a noise level, which may either have been added to the video test sequence or be naturally occurring in the video test sequence (S2). A quantization parameter is set (S3) for encoding the video test sequence, and a GOP length is also set (S4). The video test sequence is encoded (S5) and the output bitrate is determined (S6).

Figure 4:
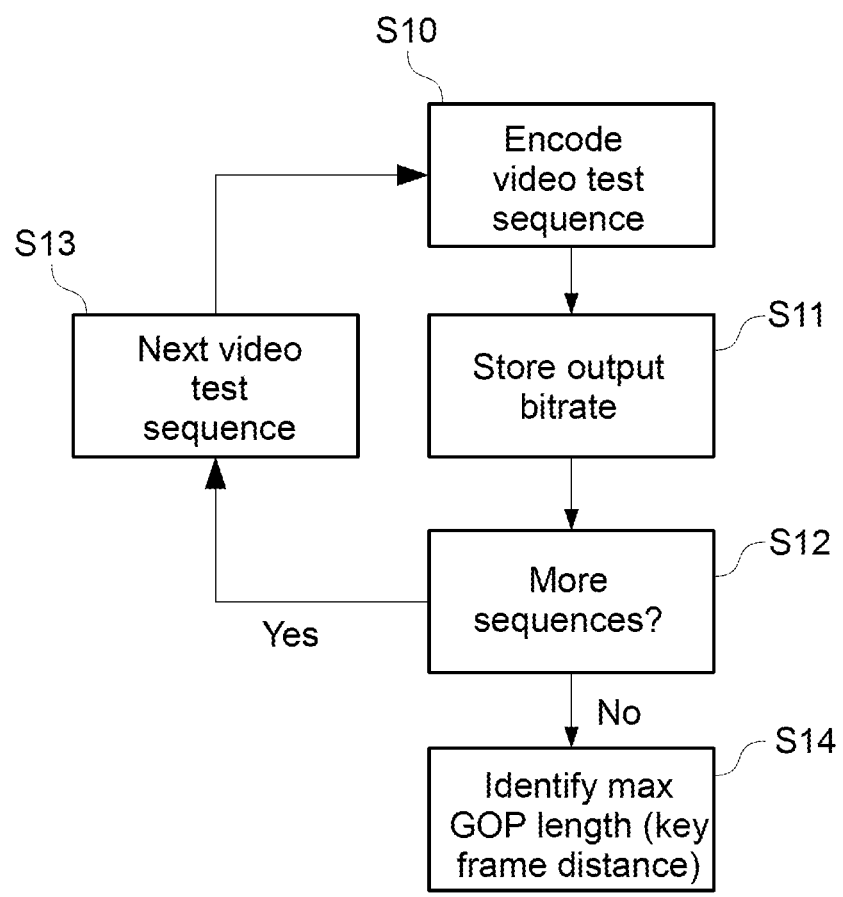
FIG. 4 is a flow chart illustrating other parts of the method of determining a maximum permissible key frame distance.

With reference to FIG. 4, the process just described is repeated with a number of video test sequences. A first video test sequence is encoded (step S10), and the output bitrate is determined and stored (S11). It is checked if there are more video test sequences to encode (S12), and if so, the next video test sequence is retrieved or provided (S13). For this second video test sequence, the method is the same, such that it is encoded and the output bitrate is stored. When a desired number of video test sequences have been encoded and the respective output bitrates have been stored, a maximum permissible GOP length is identified (S14) by finding a maximum GOP length at which output bitrate decreases in response to an increase in GOP length. If the GOP length is increased above that maximum GOP length, output bitrate no longer decreases, despite increases in GOP length. The maximum permissible GOP length may be stored, e.g., in a look-up table. When a video sequence is later to be encoded, the noise level in the video sequence may be determined and the quantization parameter to use for encoding may be chosen or set, and the corresponding maximum permissible GOP length may be found in the look-up table.

Figure 3:
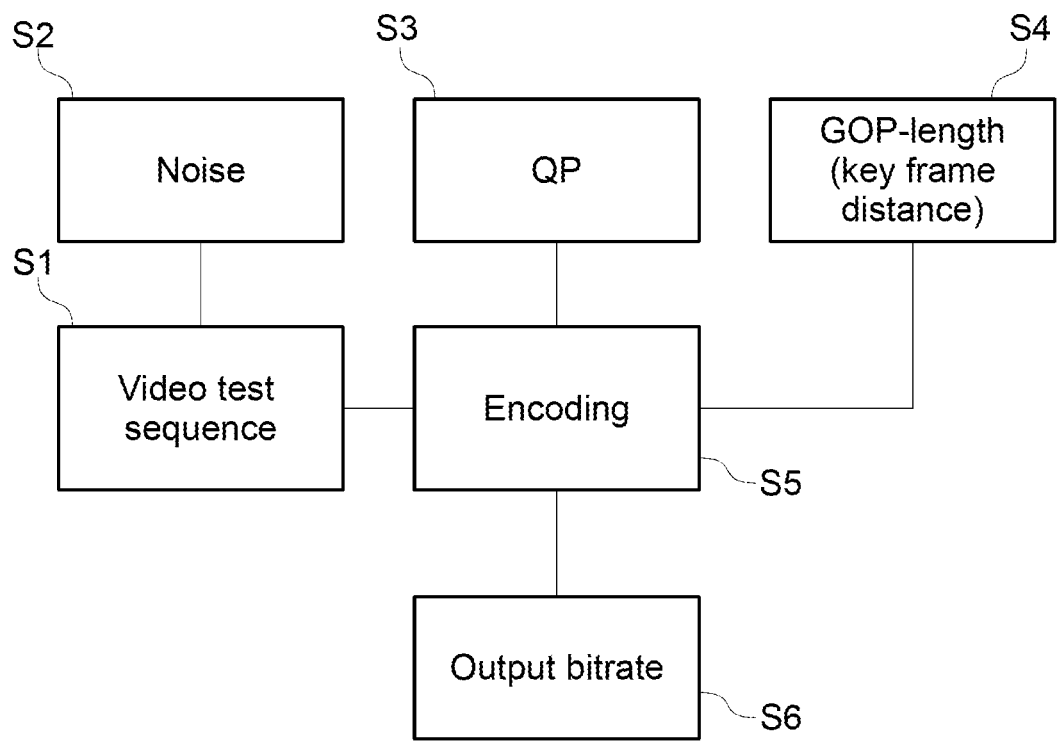
FIG. 3 is a flow chart illustrating parts of a variant of the inventive method of determining a maximum permissible key frame distance.

As discussed in connection with FIG. 3, the video test sequences have varying noise levels and are encoded using varying quantization parameters. For each combination of noise level and quantization parameter a respective maximum permissible GOP length is identified. Thus, in order to get a reliable result in the identification of the maximum permissible GOP length, each combination of noise level and quantization parameter is encoded using a plurality of different GOP lengths.

The video test sequences may be one or a few original video test sequences to which varying levels of noise are added artificially. This makes it easy to limit variation between the video test sequences to just the varying noise levels. However, artificially added noise may not necessarily affect the video test sequences in the same way as naturally occurring noise, such that the end result in terms of the identification of the maximum permissible GOP length may not be exactly the same as it would be if video test sequences captured with varying naturally occurring noise levels had been used. Still, the result will generally be close enough to be used for identifying a maximum permissible GOP length.

Another approach to generating the video test sequences is to capture several original video test sequences under varying conditions, such as varying light levels in the scene and varying ambient temperatures, giving a number of video test sequences with different noise levels. If the original video test sequences are captured in different scenes, with different levels of motion, a large number of video test sequences may be required for eliminating or at least limiting the effects of other factors than the noise on the identified maximum permissible GOP length. One way of obtaining a number of video test sequences with varying levels of naturally occurring noise is to capture a number of original video test sequences in a laboratory environment, where the light level in the scene can be controlled. By capturing several original video test sequences at different light levels, the noise level will also vary in those sequences.

Each video test sequence having one noise level may advantageously be encoded using a number of different quantization parameters. Each such combination of noise level and quantization parameter may in turn be encoded using a number of different GOP lengths. It should be noted that it will generally not be necessary to encode the video test sequences with all foreseeable GOP lengths that it may be desirable to use in the encoder. Instead, it will generally suffice to encode the video test sequences using a number of reasonably short GOP lengths, such as up to 100 and to study a trend to see how fast P-frames (or B-frames) grow with distance from the I-frame at the head of the GOP. This trend can then be used for deducing which GOP length will be the maximum permissible GOP length.

Different encoders will generally not behave in exactly the same way in terms of growth of P-frames (or B-frames) with increasing distance from the I-frame starting the GOP. Therefore, it is advisable to make the determination of the maximum permissible GOP length for the encoder that is actually going to be used for encoding. The result may not translate directly to another encoder, but may give some sort of indication.

In the description above, GOP length has been discussed as the parameter for which a permissible maximum value should be found. It should, however, be noted that this applies equally to the more general concept of key frame distance, as it has been defined in the summary section. Thus, the same approach may be used for finding a maximum permissible key frame distance. In a GOP structure using only an I-frame and subsequent P-frames (and possibly B-frames), the key frame distance is identical to the GOP length, as it is not until the start of the next GOP that the reference chain is restarted. However, in a GOP structure using also R-frames, the key frame distance will be shorter than the GOP length, as the reference chain is restarted at each R-frame. Thus, it may be seen that if R-frames are used, longer GOP lengths may be used. It may also be possible to use a maximum permissible GOP length that has been determined according to the method described above for determining a maximum permissible key frame distance for a GOP structure employing R-frames in addition to P-frames (and possibly B-frames), since the GOP length in a GOP structure without R-frames has the same effect on the growth of P-frames as the key frame distance has in a GOP structure employing also R-frames.

Figure 5:
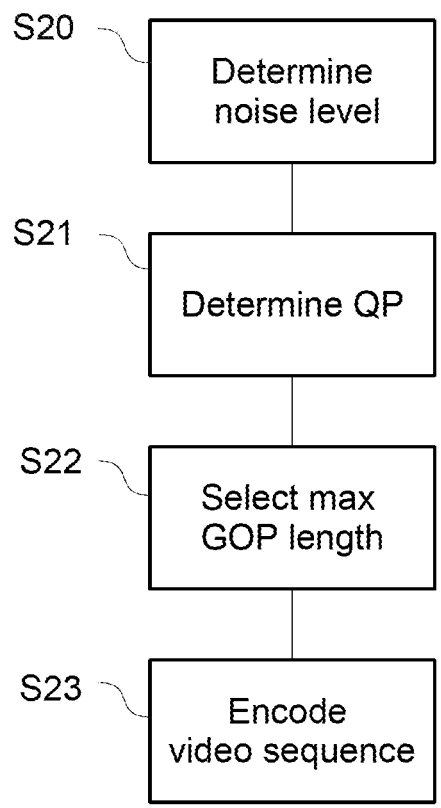
FIG. 5 is a flow chart illustrating a variant of the inventive method of encoding image frames in a video sequence.

Once maximum permissible GOP lengths or maximum permissible key frame distances for various noise levels and quantization parameters have been determined for a particular encoder, this information may be put to use when encoding video sequences. This will now be described further with reference to FIG. 5.

When a video sequence is to be encoded, be it in real time as the video sequence is being captured or be it at a later point in time, the noise level in the video sequence is determined (step S20). A quantization parameter is determined or chosen (S21), with which the video sequence should be encoded. The quantization parameter may be intended to be used for all image frames in the video sequence, and for all pixel blocks, macroblocks or encoding units in each image frame. However, the determined quantization parameter may instead just be representative of quantization parameters to use when encoding using different quantization parameters in different frames and/or using different quantization parameters in different blocks in the same frame. The determined quantization parameter may in such cases be a base quantization parameter from which the actual quantization parameter set for each image frame or pixel block may deviate up or down by a predetermined amount.

When the noise level and the quantization parameter have been determined a corresponding maximum permissible GOP length is selected (S22), for instance by consulting a look-up table created in accordance with the method described above in connection with FIGS. 3 and 4. The video sequence is then encoded (S23) taking the maximum permissible GOP length into account, such that the GOP length actually set in the encoder is no longer than the maximum permissible GOP length.

When encoding video sequences, the GOP length to be used by the encoder may in the most rudimentary encoder be fixed once and for all. In such case, the above-described method of determining a maximum permissible GOP length may be used as input for the manufacturer of the encoder, such that the fixed GOP length may be chosen wisely. In most cases, the encoder offers more flexibility in terms of GOP length selection. Some encoders give the user the possibility of choosing and setting a fixed GOP length. Such setting may be done by direct user input, or controlled by, e.g., a video management system to which the encoder is connected. In such cases, the maximum permissible GOP length may be used for limiting the range within which the user or the video management system may set the GOP length. Other encoders set the GOP length dynamically, e.g., based on motion in image frames in the video sequence. In this manner, available bandwidth and/or storage capacity may be put to good use, by encoding with long GOP lengths when there is no or little motion in the captured scene, generally implying that there is little of interest from a surveillance or monitoring perspective happening, and to encode with shorter GOP lengths when there is more motion in the scene, leading to better image quality of interesting parts of the video sequence. One such method of dynamically determining GOP length is disclosed in applicant's patent EP-3 021 579. The disclosure of that patent is hereby incorporated by reference, and the principle of the method will only be briefly summarized here.

According to the method of EP-3 021 579, changes between image frames are studied on a short-term basis and on a long term basis. By studying the amount of change both short term and long term, it may be determined if there is motion in the scene, which would be of interest for monitoring. A group value for each group of neighboring pixels of a current image frame is calculated based on information representative of the pixels in the current image frame. Group values of corresponding groups of neighboring pixels in a first sequence of image frames comprising the current image frame and a first number of preceding image frames are accumulated to form a first accumulation of accumulated group values. Group values of corresponding groups of neighboring pixels in a second sequence of image frames comprising the current image frame and a second number of preceding image frames are also accumulated to form a second accumulation of accumulated group values, wherein the second sequence of image frames includes image frames captured over a longer period of time than the image frames of the first sequence. The accumulated group values of the first accumulation are compared to the accumulated group values of corresponding groups of neighboring pixels of the second accumulation. A global change value is calculated based on the comparison of the first and second accumulations of group values and the GOP length to be used for encoding is based on the global change value.

When deciding what GOP length to use when encoding video sequences, it is possible to take into account also other system costs. For instance, the size of a buffer used for being able to provide event-based recording may be taken into account. In such event-based recording schemes, recording of a video sequence starts when, e.g., motion is detected. It is often beneficial to record also a pre-event sequence, to enable better understanding of what happened in the scene. Therefore, encoded image frames are continuously stored in a pre-event buffer. For being able to play back such a recorded video sequence, play-back has to start at an intra-frame. If it is to be ensured that there is always an intra-frame to start from in the pre-event buffer and that the pre-event sequence that can be played back is sufficiently long, the GOP length used for encoding has to be adapted to the size of the buffer. When deciding which GOP length to use for encoding, it may be set to the shorter of the maximum permissible GOP length determined as described above and a GOP length that allows a sufficiently long pre-event video sequence to fit in the available pre-event buffer.

Additionally, other system costs, such as playback time may be taken into account. If an operator wishes to play back a recorded video sequence from a certain point in time, that playback cannot begin until the preceding image frames in the GOP corresponding to that point in time have been decoded. If very long GOP lengths are used, it may take an annoyingly long time to start playback. A system limit on how long such playback start time is allowed to be may be set, and this may also be factored in when deciding what GOP length to use when encoding, such that the GOP length does not exceed neither the maximum permissible GOP length determined according to the method described above, nor a GOP length limited by the system playback time limit.

Figure 6:
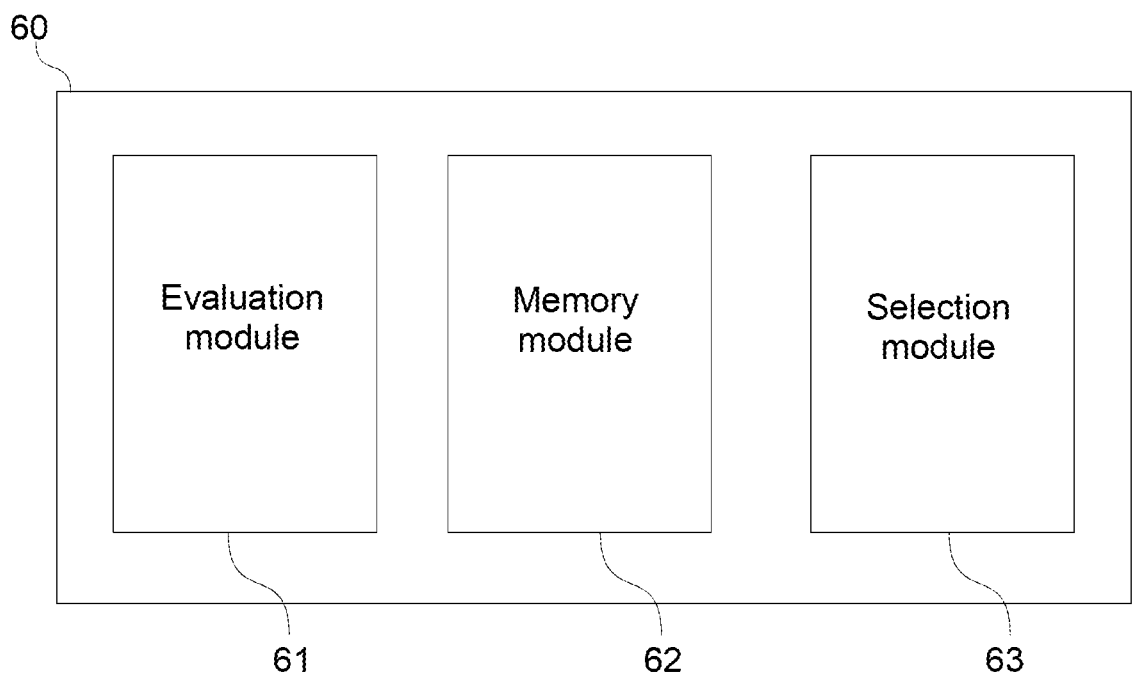
FIG. 6 is a block diagram of an embodiment of an arrangement for determining a maximum permissible key frame distance for encoding image frames in a video sequence.

The method described above for determining maximum permissible key frame distance or GOP length may be performed using an arrangement schematically shown in FIG. 6. An arrangement 60 is here shown, which comprises a test video sequence evaluation module 61 arranged to encode a plurality of video test sequences. Each video test sequence has a respective noise level, and each video test sequence is encoded using a respective quantization parameter and using a plurality of key frame distances. For each video test sequence, the evaluation module 61 is arranged to determine an output bitrate for each key frame distance. The arrangement 60 also comprises a memory module 62 arranged to store, for each combination of noise level, quantization parameter, and key frame distance, the determined output bitrate. Further, the arrangement 60 comprises a selection module 63 arranged to, for each combination of noise level and quantization parameter, identify as maximum permissible key frame distance a maximum key frame distance at which output bitrate decreases in response to an increase in key frame distance. The arrangement 60 may be embodied in hardware, firmware or software, or any combination thereof. The arrangement 60 may be integrated in an encoder, or may be arranged separately.

Figure 7:
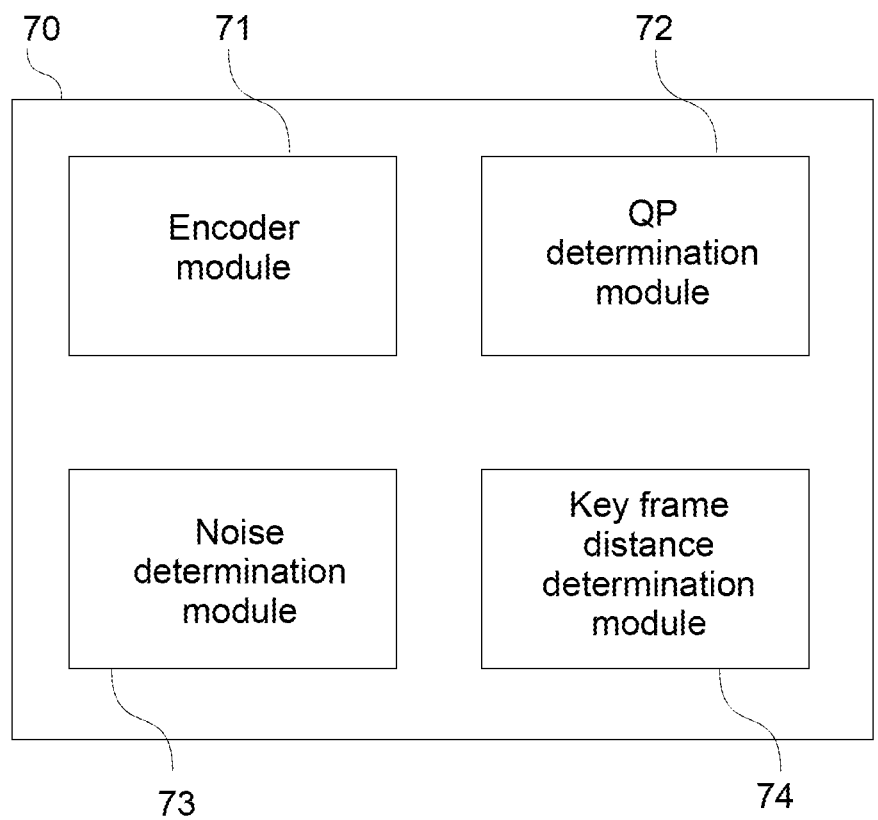
FIG. 7 is a block diagram of an embodiment of an encoding system.

In FIG. 7, an encoder system 70 is shown which may encode image frames in a video sequence in accordance with the encoding method described above. The encoder system 70 comprises an encoder module 71 arranged to process input image frames into intra-frames or inter-frames arranged in groups of pictures, each group of pictures comprising an intra-frame and one or more subsequent inter-frames. The encoder system 70 also comprises a quantization parameter determination module 72 arranged to determine a representative quantization parameter with which the image frames are to be encoded. Further, the encoder system 70 comprises a noise determination module 73 arranged to determine a noise level of at least one input image frame in the video sequence. Additionally, the encoder system 70 comprises a key frame distance determination module 74 arranged to, based on the determined noise level and the determined quantization parameter, select a maximum permissible key frame distance determined in accordance with the method described above, or using the maximum key frame distance selection arrangement also described above, and to determine a key frame distance with which the image frames are to be encoded. The determined key frame distance is less than or equal to the maximum permissible key frame distance. Similar to the arrangement 60 for determining a maximum permissible key frame distance or GOP length, the encoder system 70 may be embodied in hardware, firmware or software, or any combination thereof. The encoder system 70 may be integrated in a camera, or may be arranged separately.

Figure 8:
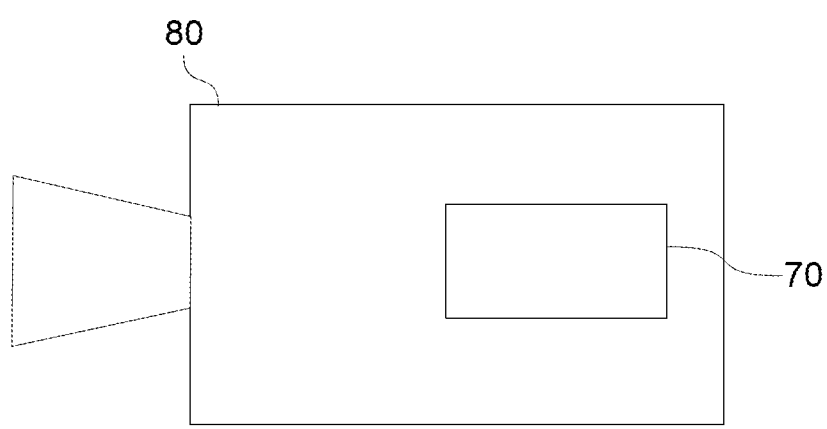
FIG. 8 is a block diagram of an embodiment of a camera.

In FIG. 8, a camera 80 is shown comprising an encoder system 70 such as the one shown in FIG. 7. The camera 80 also has a number of other components, but as these are not part of the present teachings, they are not shown and will not be further discussed here.

With the teachings described above, it is possible to save on output bitrate, thereby making good use of available bandwidth and storage capacity. It is also possible to save on other system costs, such as buffer size and playback time.

It will be appreciated that a person skilled in the art can modify the above described embodiments in many ways and still use the advantages of the disclosure as shown in the embodiments above. As an example, the GOP structure used may also include "dummy frames", i.e. inter-frames containing only skip blocks. Such dummy frames may, e.g. be used for raising frame rate compared to what is in essence encoded by the encoder. Thus, bitrate from the encoder may be kept low, while still providing the decoder in, e.g., a video management system in a control center, with a predetermined framerate. Dummy frames will not have any impact on the propagation of errors, as they simply copy information from the previously encoded and decoded frame. Thus, an adapted maximum permissible GOP length may be used when encoding, taking dummy frames into account. If, for instance, frame rate is doubled by insertion of dummy frames, the adapted maximum permissible GOP length may be found by doubling the determined maximum permissible GOP length, provided that the maximum permissible GOP length was determined without dummy frames.

The present teachings may be used with any encoding scheme using a GOP structure with an intra-frame and subsequent inter-frames, e.g., H.264, H.265 or VP8.

The methods described in this disclosure may be performed with the aid of software. To this end, a computer program product comprising a computer-readable storage medium may be provided. The computer-readable storage medium may have stored thereon instructions adapted to carry out the methods according to the present teachings when executed by a processor.

Thus, the present teachings should not be limited to the shown embodiments but should only be defined by the appended claims.

What is claimed is:

1. A method of encoding image frames in a video sequence, the image frames being encoded into a sequence of output image frames arranged in groups of pictures, each group of pictures comprising an intra-frame and one or more subsequent inter-frames, each group of pictures in the sequence of output image frames having a key frame distance defined as either a number of frames between intra-frames for groups of pictures that do not include refresh frames or a number of frames between intra-frames and refresh frames for groups of pictures that include refresh frames, the method comprising:

encoding a plurality of video test sequences, each video test sequence having a respective noise level,
wherein each video test sequence is encoded using a respective quantization parameter and using a plurality of key frame distances;
for each video test sequence determining an output bitrate for each key frame distance;
storing, for each combination of noise level, quantization parameter, and key frame distance, the determined output bitrate;
for each such combination of noise level and quantization parameter, identifying, as maximum permissible key frame distance, a maximum key frame distance for which increasing key frame distance above the maximum key frame distance does not result in the output bit rate decreasing;
for each combination of noise level and quantization parameter storing the maximum permissible key frame distance in a look-up table;
determining a noise level of at least one image frame in the video sequence;
determining a representative quantization parameter, representative of one or more quantization parameters, with which the image frames are to be encoded;
based on the determined noise level and the determined representative quantization parameter, selecting a maximum permissible key frame distance from the look up table; and
encoding the image frames in the video sequence based on the determined representative quantization parameter and using a key frame distance which is less than or equal to the selected maximum permissible key frame distance.

2. The method according to claim 1, further comprising generating the video test sequences by adding different amounts of noise to an original video test sequence.

3. The method according to claim 1, wherein the key frame distance with which the image frames are encoded is determined dynamically.

4. The method according to claim 3, wherein the key frame distance is determined based on motion in at least one image frame in the video sequence.

5. The method according to claim 1, wherein the key frame distance is a GOP length defined by a number of image frames in a group of pictures each group of pictures comprising an intra-frame and one or more subsequent inter-frames.

6. The method according to claim 1, wherein the image frames are encoded using a key frame distance which is less than or equal to the smaller of the maximum permissible key frame distance and a system maximum key frame distance, the system maximum key frame distance being determined based on at least one of a system buffer size and a system playback time limit.

7. An encoder system for encoding image frames in a video sequence the system comprising:

an encoder module arranged to process input image frames into intra-frames or inter-frames arranged in groups of pictures, each group of pictures comprising an intra-frame and one or more subsequent inter-frames, each group of pictures in the sequence of output image frames having a key frame distance defined as either a number of frames between intra-frames for groups of pictures that do not include refresh frames or a number of frames between intra-frames and refresh frames for groups of pictures that include refresh frames;

a quantization parameter determination module arranged to determine a representative quantization parameter, representative of one or more quantization parameters, with which the image frames are to be encoded;

a noise determination module arranged to determine a noise level of at least one input image frame in the video sequence; and a maximum key frame distance selection arrangement for determining a maximum permissible key frame distance for use in encoding image frames in a video sequence, the arrangement comprising:

a test video sequence evaluation module arranged to encode a plurality of video test sequences, each video test sequence having a respective noise level, wherein each video test sequence is encoded using a respective quantization parameter and using a plurality of key frame distances, and for each video test sequence determine an output bitrate for each key frame distance;

a memory module arranged to store, for each combination of nose level, quantization parameter, and key frame distance, the determined output bitrate; and a selection module arranged to, for each such combination of noise level and quantization parameter, identify as maximum permissible key frame distance a maximum key frame distance for which increasing key frame distance above the maximum key frame distance does not result in the output bit rate decreasing and, for each combination of noise level and quantization parameter, store the maximum permissible key frame distance in a look-up table;

the encoder system further comprising:

a key frame distance determination module arranged to, based on the determined noise level and the determined representative quantization parameter, select a maximum permissible key frame distance from the look-up table and to determine a key frame distance with which the image frames are to be encoded, the key frame distance being less than or equal to the maximum permissible key frame distance, wherein the encoder module is arranged to encode the image frames in the video sequence using the determined quantization parameter and the determined key frame distance.

8. A camera comprising an encoder system for encoding image frames in a video sequence, the system comprising:

an encoder module arranged to process input image frames into intra-frames or inter-frames arranged in groups of pictures, each group of pictures comprising an intra-frame and one or more subsequent inter-frames, each group of pictures in the sequence of output image frames having a key frame distance defined as either a number of frames between intra-frames for groups of pictures that do not include refresh frames or a number of frames between intra-frames and refresh frames for groups of pictures that include refresh frames;

a quantization parameter determination module arranged to determine a representative quantization parameter, representative of one or more quantization parameters, with which the image frames are to be encoded;

a noise determination module arranged to determine a noise level of at least one input image frame in the video sequence; and a maximum key frame distance selection arrangement for determining a maximum permissible key frame distance for use in encoding image frames in a video sequence, the arrangement comprising:

a test video sequence evaluation module arranged to encode a plurality of video test sequences, each video test sequence having a respective noise level, wherein each video test sequence is encoded using a respective quantization parameter and using a plurality of key frame distances, and for each video test sequence determine an output bitrate for each key frame distance;

a memory module arranged to store, for each combination of nose level, quantization parameter, and key frame distance, the determined output bitrate; and a selection module arranged to, for each such combination of noise level and quantization parameter, identify as maximum permissible key frame distance a maximum key frame distance for which increasing key frame distance above the maximum key frame distance does not result in the output bit rate decreasing and, for each combination of noise level and quantization parameter, store the maximum permissible key frame distance in a look-up table;

the encoder system further comprising:

a key frame distance determination module arranged to, based on the determined noise level and the determined representative quantization parameter, select a maximum permissible key frame distance from the look-up table and to determine a key frame distance with which the image frames are to be encoded, the key frame distance being less than or equal to the maximum permissible key frame distance, wherein the encoder module is arranged to encode the image frames in the video sequence using the determined quantization parameter and the determined key frame distance.

9. A non-transitory computer-readable storage medium including instructions which, when executed by a device having a processing capability, cause the device to execute instructions for encoding image frames in a video sequence, the image frames being encoded into a sequence of output image frames arranged in groups of pictures, each group of pictures comprising an intra-frame and one or more subsequent inter-frames, each group of pictures in the sequence of output image frames having a key frame distance defined as either a number of frames between intra-frames for groups of pictures that do not include refresh frames or a number of frames between intra-frames and refresh frames for groups of pictures that include refresh frames, the instructions causing the device to perform operations comprising:

encoding a plurality of video test sequences, each video test sequence having a respective noise level, wherein each video test sequence is encoded using a respective quantization parameter and using a plurality of key frame distances;

for each video test sequence determining an output bitrate for each key frame distance;

storing, for each combination of noise level, quantization parameter, and key frame distance, the determined output bitrate;

for each such combination of noise level and quantization parameter, identifying as maximum permissible key frame distance a maximum key frame distance for which increasing key frame distance above the maximum key frame distance does not result in the output bit rate decreasing; and for each combination of noise level and quantization parameter storing the maximum permissible key frame distance in a look-up table;

determining a noise level of at least one image frame in the video sequence;

determining a representative quantization parameter, representative of one or more quantization parameters, with which the image frames are to be encoded;

based on the determined noise level and the determined representative quantization parameter, selecting a maximum permissible key frame distance from the look up table; and encoding the image frames in the video sequence based on the determined representative quantization parameter and using a key frame distance which is less than or equal to the selected maximum permissible key frame distance.

* * * * *